United States Patent Office 3,393,162
Patented July 16, 1968

3,393,162
BLOCK AND GRAFT COPOLYMER
COATED PIGMENTS
George Harold Cox, London, Desmond Wilfrid John Osmond, Iver Heath, Maurice Wainwright Skinner, Maidenhead, and Charles Harold Young, Egham, England, assignors to Imperial Chemicals Industries Limited, London, England, a corporation of Great Britain
No Drawing. Filed Oct. 4, 1962, Ser. No. 228,237
Claims priority, application Great Britain, Oct. 4, 1961, 35,752/61
9 Claims. (Cl. 260—4)

This invention relates to processes of coating dispersed solid particles such as pigments with organic polymeric material, to solid particles coated by such processes, to coating compositions containing such coated particles.

Pigments coated with organic material are particularly useful in coating compositions such as paints and lacquers since the coating on the pigment may often be used to control wetting of the pigment surface by the organic film-forming component of the coating composition. In the final dry film formed from the coating composition the pigment may then be more intimately associated with the organic film-forming component with a resulting improvement in control over pigment flotation, silking and weathering properties. Alternatively, the coating on the pigment may be used to isolate a reactive pigment surface from the film-forming component.

The present invention provides a new way of coating dispersed solid particles such as pigments to produce improved products and is generally applicable to particles of solid materials which are substantially unaffected by the liquid in which they are dispersed. It is particularly useful, for example, for improving dispersions of difficult pigments such as dyestuff pigments and metallic powders and of polymer particles such as polyvinyl chloride, polyvinyl acetate, polyvinylidene chloride, polyethylene and polyacrylonitrile.

According to the invention solid particles are coated with organic polymeric material by dispersing them in a liquid containing in solution a block or graft copolymer comprising components of different degrees of polarity and modifying the polarity of the solution to precipitate at least one, but not all, the components of the copolymer on the solid particles.

The particles may be dispersed in the copolymer solution by a grinding, milling or other technique and the polarity of the solution may be modified by adding a liquid of different polarity or by removing, e.g. by evaporation or solvent partition, one component of a mixture of liquids of different polarities.

An advantage of coating particles in this particular way is that although the particles are coated by one component of the block or graft copolymer, a second component of different polarity remains in solution, or more correctly, remains solvated by the liquid. These solvated groups enhance the stability of the particles in the dispersion. This can be advantageous in several ways.

Firstly, where the dispersion is to be incorporated into a coating composition it is clearly an advantage to use a stable dispersion in which the particles do not tend to flocculate.

Further, the relationship of polarity of the components of the block or graft copolymer can be so chosen in relation to that of the liquid phase of the coating composition that whilst the precipitated component remains insoluble on the particles on incorporation in the coating composition, another component remains solvated, thus assisting in stabilising the dispersion in the coating composition itself. That is to say, the improved properties of the dispersion may be carried over into the coating composition.

The present invention also provides, therefore, dispersions of solid particles in liquids, the particles being coated with a block or graft copolymer, one component of which is solvated by the liquid. Such dispersions, which contain a film-forming component, may be coating compositions; for example, the dispersion may be one of solid particles of a film-forming polymer or it may be a dispersion of pigment particles which also contains a film-forming material either in solution or in disperse form.

Additionally, the process of the invention leads to the possibility of making dry coated particles by evaporating a liquid containing solid particles dispersed therein, the particles being stabilised in the liquid by a block or graft copolymer of which one component is precipitated on the surface of the particles and another is solvated by the liquid. The dried particles may be readily re-dispersed in liquids which re-solvate the second component of the block or graft copolymer. When drying the dispersion to produce re-dispersible powders, the composition of the volatile liquid dispersion medium should be so balanced that as the liquid is evaporated the polarity of the dispersion does not revert to its initial value. This is so that the component of the stabilising copolymer precipitated during the modification of polarity remains on the particle surface and does not become re-solvated. The dried particles may then be re-dispersed in a liquid of similar polarity.

Pigments coated by this invention are particularly useful in dispersion-type coating compositions in which a film-forming polymer is dispersed in a volatile liquid in which it is insoluble, even more so in those compositions in which the film-forming polymer particles are themselves stabilised in disperse form in a similar way. The coated pigments may be used in combination with dispersions of polymer particles as described in patent applications Nos. 169,609, 169,610, and 212,469, i.e. by means of a block or graft copolymer, one component of which is compatible with, and is an integral part of, the film-forming polymer particles, and another component of which is solvated by the volatile liquid. In such cases the block or graft copolymer used to stabilise the film-forming polymer dispersion may be similar to, or the same as, that used to coat and stabilise the pigment particles. Alternatively, film-forming polymer particles may be dispersed by the process of this invention and mixed with pigment particles dispersed in the same way.

The nature of the components of the block or graft copolymer used to coat the particles and their relative polarity will depend on the desired degree of polarity, after modification, of the liquid phase.

For example, if it is desired to have the coated particles dispersed in a liquid which after being modified is non-polar, the block or graft copolymer should contain one component of a relatively polar nature which, in consequence, will be insoluble in the modified liquid, and another component of a less polar nature which will remain solvated by the liquid even after modification.

On the other hand, if the liquid, after modification is required to be of a polar nature, then the component to be precipitated on the particles will need to be relatively non-polar in nature, and the component to remain solvated will need to be of a polarity more similar to that of the modified liquid.

In any case, however, since the particles are coated from a solution of the block or graft copolymer, the components of the copolymer should not be so vastly different in degree of polarity that the copolymer is not wholly soluble in any organic liquid at all.

Further, it is desirable that the component to be precipitated on the particles should contain highly polar groups particularly when that component as a whole is of a relatively non-polar nature. These highly polar groups of the copolymer components when initially in solution tend to be adsorbed on the particles surface and, during the modification of the polarity of the liquid phase, promote precipitation of that component on the surface.

The invention may be illustrated by way of example as follows. Liquids may be roughly divided up according to their degree of polarity into the following five groups:

| Group | Description | Examples |
| --- | --- | --- |
| 1 | Intensely polar | Water, methanol and dimethyl formamide. |
| 2 | Strongly polar | Lower ketones, e.g. acetone; lower alcohols, e.g. isopropanol. |
| 3 | Moderately polar | Moderate chain length esters, e.g. butyl acetate; higher ketones, e.g. diisobutyl ketone. |
| 4 | Weakly polar | Aromatic hydrocarbons, long chain esters, e.g. dicetyl adipate. |
| 5 | Non-polar | Aliphatic hydrocarbons, e.g. white spirit. |

When, in applying the invention, the polarity of the copolymer solution is modified by addition of liquid of a different polarity, the objective should generally be to move from one group into or through an adjacent group. Unless the polarity is so modified that at least an adjacent group is entered then the modification is probably insufficient to secure adequate precipitation of one copolymer component on the particles. On thhe other hand it is usually not necessary to move further than into the next but one group. It would, in fact, hardly be feasible to move further than into the next group but one, for in general it is difficult to provide a copolymer wholly soluble in the starting liquid and yet having one component which would still remain solvated after such a radical change in polarity of the liquid.

It will be appreciated that this grouping of liquids according to polarity is rough and arbitrary and that it is used only to illustrate the principle of the invention. More specific forms of the invention are shown by way of example in the following table. These relate to processes in which the particles are dispersed in the block or graft copolymer solution, the polarity of which is then modified by addition of excess of another liquid.

methylol acrylamide, this being crosslinked by heating to 150° C. in the presence of an acid catalyst.

This application of the invention is particularly useful when it is desired to isolate an active pigment which would otherwise tend to react with other ingredients of the coating composition or to dissolve in the film-forming polymer and "bleed" through it into overlying coatings.

In a preferred embodiment of the invention particles are dispersed in a solution of a block or graft copolymer, one component of which is a random copolymer of monomers of high and intermediate polarity and another component of which is relatively non-polar, the first-mentioned component being precipitated on the particles by addition to the dispersion of a relatively non-polar liquid or removal of a polar component of a mixture of liquids.

For example, the invention may be applied to pigments for use in coating compositions based on dispersions of polyvinyl chloride, polyvinyl acetate or acrylate polymers in relatively non-polar liquids wherein the disperse polymer particles are stabilised by a block or graft copolymer, one component of which is compatible with and forms an integral part of the particles and another component is solvated by the organic liquid. In this case the block or graft copolymer used to coat the pigment may comprise as one component a random copolymer of the acrylate of the dispersion with a more polar component, the second solvatable component which remains solvated being the same as that used to stabilise the polymer dispersion.

By the term "acrylate polymer" we means polymers and copolymers comprising acrylic or methacrylic acid or an ester, amide or nitrile of such as acid. Typical materials which are suitable as monomers in this invention include acrylonitrile, acrylates and methacrylates of aliphatic alcohols such as methyl, etheyl, octyl, lauryl, and natural fat alcohols. Preferred monomers for use in the production of polymers for the preparation of coating compositions according to this invention are methyl methacrylate, β-ethoxy ethyl methacrylate, ethyl acrylate, acrylo-

| Block or Graft Copolymer | | Dissolved In— | Modifying Liquid |
| --- | --- | --- | --- |
| Precipitated Component | Stabilising Component | | |
| Random copolymer of methyl methacrylate and methacrylic acid (20:1). | Degraded natural rubber | Xylol (Group 4) | White Spirit (Group 5). |
| Random copolymer of styrene and methacrylic acid (20:1). | Polyethylene glycol methacrylate | Acetone/ethanol (Group 2). | Water (Group 1). |
| Random copolymer of methyl methacrylate, acrylic acid and acrylamide (70:25:5). | Polystyrene | Acetone (Group 2). | Xylol (Group 4). |
| Random copolymer of lauryl methacrylate and methacrylic acid. | Polymethyl methacrylate | Xylol (Group 4) | Ethyl Acetate (Group 2). |
| Random copolymer of methyl methacrylate and methacrylic acid (1:1). | Random copolymer of methyl methacrylate and ethyl acrylate (1:1). | Butanol/Acetone (Group 2). | Butyl Acetate (Group 3). |

The component which is to remain solvated during the process should comprise from 5–60% by weight of the block or graft copolymer, preferably from 10–33%.

A further feature of this invention is that after coating the particles by the process described above, the precipitated component may be modified, e.g. by crosslinking active groups therein to render it insoluble in a much wider range of liquids including those of polarity similar to that of the copolymer solution in which the particles were originally dispersed. This feature extends still further the possible uses of the coated particles.

For example, a suitable precipitated component of the block or graft copolymer would be a random copolymer of methyl methacrylate, methacrylic acid and glycidyl methacrylate, subsequently crosslinked on the particle surface by heating the dispersion to approximately 150° C. for at least 15 minutes, preferably in the presence of a strong organic base, e.g. trimethyl benzyl ammonium hydroxide.

Another crosslinkable component would be a random copolymer of a suitable acrylate, e.g. ethyl acrylate, and nitrile, methacrylic acid and acrylic acid, and amides of these acids. Combinations of the above monomers may be used and other typical materials which are suitable for use as comonomers include dimethyl itaconate, diethyl maleate and maleic anhydride. Such polymers may be dispersed in relatively non-polar organic liquids such as aliphatic hydrocarbons.

For example, the disperse polymer may be substantially polymethyl methacrylate or a copolymer consisting largely of polymethyl methacrylate, stabilised by a block or graft copolymer of methyl methacrylate and a natural or synthetic solvatable polymeric constituent such as rubber. In this case a suitable block or graft copolymer for coating the pigment particles to be used in the coating composition would be one in which one component is a random copolymer of methyl methacrylate with a minor proportion of methacrylic acid, and another component is degraded rubber. The methacrylic acid in the random copolymer provides highly polar groups which promote precipitation of that component on the pigment particles. The degraded rubber provides the component which remains solvated by the relatively non-polar liquid phase of the coating composition.

The random copolymer component may contain up to 10% by weight of methacrylic acid, and the block or graft copolymer may contain from 10–30% by weight of the solvatable component.

For coating the pigment the block or graft copolymer may initially be in solution in a plasticiser or a volatile organic solvent, or a mixture of both.

The block or graft copolymer may be prepared in solution, the solution being used as such to coat the pigment.

The invention is further illustrated by the following detailed examples in which parts are by weight.

Example 1

(a) Preparation of block or graft copolymer.—1000 parts of dicyclohexyl phthalate, 30 parts of a 50% solids solution of heavily degraded rubber in xylol and 5 parts of benzoyl peroxide were placed in a stirred reactor equipped with heating means and heated to 90° C. under an inert atmosphere. A mixture of 99 parts methyl methacrylate, 1 part methacrylic acid and 3 parts of benzoyl peroxide were pumped into the batch uniformly over 4 hours. The batch was maintained at 90° C. during this time and for 30 minutes after the end of the addition.

(b) Coating of pigment.—190 parts of this copolymer solution were premixed with 20 parts of a vegetable black pigment in a heavy duty mixer and dispersed on a triple roll mill. The resultant paste was returned to the mixer and a mixture of 180 parts of mineral spirits and 20 parts of octyl alcohol incorporated very slowly, with thorough mixing. Towards the end of the addition the mixture became very fluid and the final product was a stable, mobile tinting base of excellent dispersion, capable of indefinite further dilution with aliphatic hydrocarbon.

Example 2

(a) Preparation of block or graft copolymer.—1000 parts of xylol were placed in the reactor of Example 1 together with 60 parts of a liquid synthetc polybutadiene, 50 parts of butanol and 5 parts of benzoyl peroxide. The charge was heated to 90° C. under inert gas and a mixture of 200 parts of methyl methacrylate, 12 parts of acrylic acid and 2 parts of lauroyl peroxide pumped in over 3 hours. The batch was held at 90° C. for a further 20 minutes and after a further 1000 parts of xylol had been added and incorporated, cooled to room temperature.

(b) Coating of pigment.—2000 parts of this copolymer solution and 20 parts of butanol were placed in a pebble mill and 2400 parts of rutile titanium dioxide added in three steps with 15 minutes dispersion between each. The charge was ground for 18 hours after which time a fluid dispersion of excellent fineness was produced. This dispersion was discharged into a high speed mixer and 2000 parts of mineral spirits added slowly with thorough agitation. The resultant product was a stable, very finely dispersed, millbase which could be further diluted with aliphatic diluents.

(c) Coating composition.—Into 1000 parts of the coated pigment dispersion were stirred 300 parts of acetyl tributyl citrate and 1100 parts of a non-aqueous dispersion of 54% solids of a 98:2 methylmethacrylate:methacrylic acid copolymer in petroleum ether. The resultant paint was stable, fluid, had good flow and opacity and films stoved at 100° C. had good gloss, were free from the defect of marring black when rubbed with soft metals, i.e. silver coins, and had no tendency to lose gloss on soaking in warm water. Comparison paints made in a similar way, but using conventional wetting agents to disperse the pigment, i.e. resin esters, high acid value alkyd resins, titanium organic complexes, etc., had poorer storage stability, tending to develop flocculation and non-Newtonian viscosity. Films stoved at 100° C. were very glossy, but were inferior in flow and opacity, in resistance to coin marring, and in some cases, lost gloss on water immersion at 100° F.

Example 3

(a) Preparation of block or graft copolymer.—50 parts of high molecular weight polyisobutylene were masticated under inert gas in a scroll-type exteremely heavy duty masticator for 2 hours while a mixture of 66 parts of re-distilled methyl methacrylate and 4 parts of dimethyl aminoethyl methacrylate were injected into the mixing chamber which was maintained by circulation of refrigerant at +5° C. After a further 1 hour's mastication, 170 parts of xylol were injected and incorporated before the masticated cake was removed and dissolved in a further 550 parts of xylol.

(b) Coating of pigment.—190 parts of this copolymer solution were mixed with 87 parts of yellow oxide pigment and dispersed by grinding for 20 minutes. 150 parts of white spirit mixed with 5 parts of nonanol was then slowly incorporated into the grinding mass to give a good, stable, fluid millbase.

(c) Coating composition.—110 parts of the millbase were blended with 100 parts of a long oil length linseed pentaerythritol alkyd vehicle of 85% solids which contained the necessary driers and other additives. The resultant paint had exceptional opacity, flow and brilliance of gloss compared with a control in which the alkyd vehicle was itself used as the pigment dispersing agent in the normal way.

Example 4

(a) Preparation of block or graft copolymer.—A synthetic, graftable backbone was prepared in the following way: 1000 parts of dry methyl ethyl ketone, 450 parts of styrene and 50 parts of ethylene glycol mono-methacrylate were placed in the apparatus of Example 1 and 10 parts of benzoyl peroxide added. The whole was heated to reflux temperature and held there until polymerisation was substantially complete (about 4 hours). After cooling, 150 parts of methacryloyl chloride and 300 parts of pyridine were added and the reactor sealed for 24 hours, 50 parts of methanol were added to destroy excess acid chloride and hydrogen chloride and pyridine removed by passage through columns of strongly basic and strongly acidic ion exchange resins. This back-bone was converted to an ester-linked "graft" copolymer as follows: 800 parts of acetone, 200 parts of methanol and 100 parts of the solution of "backbone" polymer prepared as above were charged to the apparatus of Example 1, together with 6 parts of acrylamide, 30 parts of methacrylic acid, 60 parts of ethyl acrylate, 70 parts of methyl methacrylate and 5 parts of azo-bis-diisobutyronitrile. The mixture was heated to reflux and held for 4 hours when polymerisation was substantially complete.

(b) Coating of pigment.—1600 parts of this copolymer solution were mixed with 1800 parts of rutile titanium dioxide and the mixture was then ground for 15 minutes. A mixture of 1200 parts of xylol and 400 parts of mineral spirits were added slowly, as described in previous examples, to yield a good, stable millbase, dilutable with xylol, diisobutyl ketone or similar moderately strong solvents.

(c) Coating composition.—1500 parts of this millbase were blended with 1100 parts of a 6% solids solution in xylol of a coconut oil-modified short oil glyptal resin and 600 parts of a 50% solids solution of a butylated melamine formaldehyde resin in 3:1 xylol:butanol. This paint gave films of excellent gloss, flow and opacity. In particular, the characteristic loss of "fulness" of gloss on severe over-bake was less pronounced than with conventional methods of dispersion. 600 parts of the same millbase were blended with 1000 parts of a 33% solution of vinyl copolymer having the composition styrene 60%, ethyl acrylate 33%, acrylic acid 7% in a mixture of xylol 50%, diisobutyronitrile 40%, butanol 10% and with 80 parts of a polyfunctional commercial epoxide resin.

10 parts of a quaternary ammonium base was added and films were stoved at 150° C. for 35 minutes. Gloss, flow and opacity were excellent, and the ease with which the surface can be marred with a silver coin which usually characterises finishes of this type was largely suppressed.

Example 5

(a) Preparation of block or graft copolymer.—A synthetic "blockable" backbone was prepared as follows: 750 parts of pure benzene, 750 parts of washed, inhibitor-free lauroyl methacrylate, 75 parts of allyl alcohol and ½ part of benzoyl peroxide were placed in the apparatus of Example 1 and heated to reflux temperature. Additional ½ part additions of benzoyl peroxide were made at 3 hourly intervals over a total heating time of 18 hours, by which time conversion was substantially complete. The polymer solution was diluted with 1500 parts of xylol and washed repeatedly with water to remove free allyl alcohol and then dried over sodium sulphate. 25 parts of acryloyl chloride and 100 parts of pyridine were added and the whole allowed to stand overnight under a dry atmosphere. The polymer was recovered by pouring the whole into a large excess of methanol which precipitated the methacrylated polymer as a sticky rubber, which coagulated and could be filtered off and dried under vacuum. This polymer was converted to an ester-linked "block" as follows: 1000 parts of isobutyl sextol phthalate, 50 parts of the nonvolatile modified polymer recovered from above, 98 parts of methyl methacrylate and 2 parts of methacrylic acid together with 5 parts of azo-bis-diisobutyronitrile were placed in the apparatus of Example 1, heated under inert gas to 80° C. and maintained so for 3½ hours.

(b) Coating of pigment.—720 parts by weight of the cool copolymer solution were pre-mixed with 440 parts by weight of "cyan" blue and then ground for 20 minutes to a fine dispersion. 600 parts by weight of mineral spirits were slowly run into the dispersion unit while it was running, thus obtaining rapid and complete incorporation. The result was a fluid, stable millbase, readily dilutable with aliphatic hydrocarbon liquids.

(c) Coating composition.—100 parts of this millbase were blended with 35 parts of isobutyl sextol phthalate and 260 parts of acrylic copolymer in a non-aqueous dispersion as in Example 2(c). The resultant paint was thinned to 50% solids with petroleum ether to yield a very stable, fluid, dark blue paint. Films stoved at 90° C. were very glossy, had good flow, opacity and colour development. On soaking in warm water, their colour and gloss retention were excellent. Corresponding paints based on the same vehicle, plasticiser, pigment and thinner composition but using a variety of conventional dispersion agents gave very unstable, false-bodied paint. Films had poor flow and colour development and rather poor initial gloss. On water soak, whitening and loss of gloss were rapid and severe.

Example 6

Into 2000 parts by weight of the copolymer solution of Example 2 were mixed 30 parts of octyl alcohol, 2600 parts of rutile titanium dioxide and 100 parts of "cyan" blue. The pigment was dispersed for 30 minutes and 6000 parts of an 80% solids solution in mineral spirits of a long oil, linseed pentaerythritol alkyd were then added over 30 minutes with continuous stirring. The resultant pastel blue paint was of good gloss and flow and the colour development was normal for such a reduction in the blue. It was, however, substantially free from flooding and floating, unlike a corresponding co-grind in which a small proportion of the alkyd vehicle was used as the dispersant in the usual way.

Example 7

(a) Preparation of block or graft copolymer.—A synthetic stabiliser precursor was prepared by charging 190 parts of butyl acetate and 10 parts of ethyl acetate to a reactor, raising to reflux (120° C.) and feeding in over a period of five hours a mixture of 76 parts lauryl methacrylate, 19 parts octyl methacrylate, 5 parts glycidyl methacrylate and 1 part benzoyl peroxide paste (60% solids). 0.5 part of a complex alkyl amine known as "Armen" DMCD was added as catalyst for the subsequent esterification stage and the reflux continued for a further hour to destroy residual peroxide initiator. Molecular weight was estimated by viscometric methods to be 75,000. 2.5 parts of acrylic acid together with a small amount (approx. 1/10 of a part) of hydroquinone were added and the charge raised to reflux. After 6 hours the acid value of the solution had dropped from 6.65–5.89 mils which corresponds approximately to the addition of 3 acrylic acid residues to each molecule. Solids were determined as 32% and the product was a clear golden syrup.

A synthetic graft dispersion agent was prepared by charging 200 parts of ethyl acetate, 300 parts of the above precursor, 97 parts methyl methacrylate, 3 parts methacrylic acid and 1 part azo-bis-isobutyronitrile initiator, raising to reflux (85° C.) and holding for 2 hours. A further 1 part of initiator was then added and the charge refluxed for a further 2 hours. The molecular weight of the grafted side chains was estimated to be about 30,000 and the solids content was 31%. The product was an opalescent yellow syrup.

(b) Coating of particles.—25 parts dried polyvinyl chloride particles were dispersed in 5 parts graft block copolymer solution as prepared above, 35 parts aromatic high boiling solvent, 2.5 parts nonanol and 12.5 parts of the plasticiser sextol phthalate. After 20 minutes 35 parts petroleum spirit were added with agitation. This gives a re-dispersed polyvinyl chloride which when stoved at 150° C. for half an hour gave a clear film. The dispersion may be pigmented using as millbase a pigment dispersion stabilised with the same graft block copolymer solution. When pigmented with rutile titanium dioxide at 7% pigment volume concentration with 3% graft block copolymer solids on pigment, a bright glossy film was obtained on stoving at 150° C. for half an hour.

Example 8

(a) Preparation of copolymer.—A copolymer solution was prepared as described in Example 7(a).

(b) Coating of particles.—9.25 parts of the copolymer solution were blended with 6.6 parts isobutyl cyclohexanyl phthalate and to the blend were added 2 parts of aluminium paste (65% aluminium flake by weight). The mixture was stirred to a smooth paste and a mixture of: dicyclohexanyl phthalate, 9.9 parts; nonyl alcohol, 2.5 parts; was added with stirring.

The dispersion of aluminium was then stirred at high speed and 20 parts of aliphatic hydrocarbon boiling in the range 70–95° C. and 3.15 parts of aliphatic hydrocarbon boiling in the range 230–240° C. were slowly added.

(c) Coating composition.—The aluminium dispersion was then mixed with 49 parts of a stable dispersion of methyl methacrylate polymer (50% polymer). When sprayed onto an undercoated metal panel and stoved at 127° C. for half an hour, a smooth, glossy film of uniform metallic appearance was obtained.

Example 9

Example 6 was repeated save that after the initial grind stage, instead of adding alkyd solution, a mixture of 100 parts of high boiling kerosene, 900 parts of mineral spirits and 1000 parts of petroleum ether was incorporated into the preliminary pigment dispersion. The resultant stable, fluid, millbase was poured into shallow trays and the liquid allowed to evaporate at room temperature. The less volatile aliphatic hydrocarbons were the last to evaporate thus maintaining the modified polarity of the liquid phase and preventing re-solvation of the precipitated component of the copolymer. The friable, mud-cracked cakes of dry pigment, were pulverised by light dry grinding.

This pigment, when added in appropriate quantity to long oil alkyd vehicles of the type described in Example 6, or to non-aqueous acrylic dispersions in petroleum ether as in Example 2(c) and Example 5(c), needed no grinding, but only a short period of vigorous agitation to develop finished paints of full gloss, opacity and tinctorial strength.

Example 10

(a) Preparation of copolymer.—A copolymer solution was prepared as described in 7(a).

(b) Coating of pigment particles.—180 parts rutile titanium dioxide were ground in a mixture of 54 parts methyl ethyl ketone and 15 parts toluene to reduce the pigment to a finely dispersed state. 80 parts of odourless aliphatic hydrocarbon boiling in the range 140–160° C. were added slowly and with stirring to the dispersion. The dispersion was then spray dried to produce a free-flowing powder which was readily re-dispersible by vigorous stirring in aliphatic hydrocarbon.

Example 11

A graft copolymer solution was prepared as follows: 800 parts of xylol, 200 parts of nonanol, 20 parts of degraded rubber (non-volatile), and 5 parts of benzoyl peroxide were placed in the apparatus of Example 1 and heated to and maintained at 90° C. under an inert atmosphere. A mixture of methyl methacrylate (90 parts), glycidyl methacrylate (6 parts), methacrylic acid (4 parts) and benzoyl peroxide (2 parts), was fed into the batch over 4 hours. After a further 30 minutes the batch was cooled.

1000 parts of this product were mixed with 1200 parts of rutile titanium dioxide and dispersed for 25 minutes. 1000 parts of white spirit were then slowly incorporated to yield a stable, fluid, well-dispersed millbase.

To 2000 parts of this base were added 10 parts of benzyl trimethyl ammonium hydroxide catalyst and the whole placed in the apparatus of Example 1. The temperature was raised to 140° C. under an inert gas blanket and maintained for 45 minutes. On cooling, the superficial properties of the dispersion appeared unchanged, but the coating could not be removed and the properties of the dispersion destroyed, even if it was diluted with strong solvent, e.g. acetone, to the point at which the dispersion became unstable because of the insolubility of the rubber chains. Such a partially coagulated dispersion could be recovered, unimpaired, by adding enough benzene or white spirit to re-solubilise the stabilising rubber chains.

Example 12

60 parts methyl methacrylate, 38 parts ester of methacrylic acid and methoxy terminated polyethylene glycol, molecular weight 750 ("Carbowax" 750), 2 parts methacrylic acid, 25 parts isopropanol, 115 parts methyl ethyl ketone and 2 parts benzoyl peroxide were placed in a reaction vessel fitted with a stirrer and heated under reflux until the polymerisation was complete, as measured by the non-volatile content of the solution.

25 parts of the this copolymer solution were mixed with 20 parts isopropanol and 20 parts methyl ethyl ketone. Into this mixture were ground 100 parts titanium dioxide pigment. When the dispersion was sufficiently fine, 100 parts of water were slowly added with vigorous stirring. A fine, stable, dispersion of pigment was obtained which was not flocculated on addition of further quantities of water.

This dispersion was incorporated into a water-based emulsion paint with excellent results.

Dry pigment which is readily-redispersible in water may be obtained by centrifuging the dispersion, washing the resulting pigment paste with water, recentrifuging and then drum-drying the final product.

Other block or graft copolymers which are soluble in water-miscible liquids, e.g. alcohols, ketones and mixtures thereof and which may be used to coat pigments and stabilise the dispersion resulting from addition of water, may contain the following components:

The stabilising component may be, for example, vinyl or acrylic copolymers, esters of acrylic or maleic or methacrylic acid and polyethylene glycol or alkoxy-terminated polyethylene glycol, polyvinyl alcohol partly esterified with methacrylic acid or etherified with allyl chloride, and block copolymers of ethylene and propylene oxides.

The precipitated component may be a random copolymer of a major monomer and a monomer containing highly polar groups for promoting precipitation on the pigment surface. The major monomer may be for example, styrene, methyl methacrylate, vinyl toluene or ethyl acrylate.

The highly polar monomer may be, for example, acrylic acid, methacrylic acid, methacrylamide, NN'-diethyl aminoethyl methacrylate or glycidyl methacrylate/phosphoric acid reacting product.

The amount of copolymer to be used in this invention will depend on the nature of the dispersed solid particles and the ultimate use to which the dispersion is to be put. Copolymer, when precipitated on the particles even in proportions as low as say 1% by weight will in most cases reduce their tendency to flocculate. Increasing the proportion will improve the stabilising effect but the optimum proportion to be used will depend in each case on such factors as the surface area of the dispersed particles and the efficiency with which the precipitated component deposits on the particle surface. The highest proportion which can be used may be set by the ultimate use of the dispersion. For example, where the dispersion is to be used in coating compositions, compatibility of the copolymer with the film-forming component of the coating composition may be the determining factor. The optimum proportions however are readily determined by simple experiment.

What we claim is:

1. A process for coating solid particles with organic polymeric material which comprises
    dispersing said particles in liquid containing in solution a material selected from the group consisting of block and graft copolymers,
    said copolymers comprising polymeric components of different degrees of polarity, said liquid being a solvent for all of said polymeric components
    and thereafter modifying the polarity of the liquid to precipitate at least one, but not all, of said polymeric components on said particles,
    the non-precipitated polymeric component of said copolymer remaining solvated in the liquid,
    whereby said material selected from the group consisting of block and graft copolymers thereafter functions as a dispersion stabilizer for the dispersed particles.

2. A process as claimed in claim 1 in which the polymeric component which is precipitated on the solid particles contains highly polar groups.

3. A process as claimed in claim 1 in which from 5–60% by weight of the copolymer remains solvated after the precipitation.

4. A process as claimed in claim 1 in which the particles are pigment particles.

5. A process as claimed in claim 8 in which a polar polymeric component of the polymeric material is an acrylic polymer.

6. A process as claimed in claim 5 in which the acrylic polymer is a random copolymer containing carboxyl groups.

7. A process as claimed in claim 8 in which the non-polar liquid has a higher boiling point than the moderately polar liquid and the liquids are evaporated after the addition of the non-polar liquid.

8. A process of coating solid particles with organic polymeric material which comprises dispersing said particles in a moderately polar organic liquid containing in solution a material selected from the group consisting of block and graft copolymers said copolymers comprisig a polar polymeric component and a non-polar polymeric component, said organic liquid being a solvent for all of said polymeric components, and thereafter modifying the polarity of the liquid by addition of a non-polar liquid to precipitate the polar polymeric components on said particles, the non-polar polymeric component remaining solvated by the mixture of moderately polar and non-polar liquids, whereby said material selected from the group consisting of block and graft copolymers thereafter functions as a dispersion stabilizer for the dispersed particles.

9. A liquid dispersion comprising an organic liquid which contains
(1) pigment particles dispersed in said organic liquid and
(2) a member of the group consisting of block and graft copolymers, said copolymers having a polymeric component which is solvated by said organic liquid and another polymeric component which is not solvated by said organic liquid and is precipitated on the surfaces of said pigment particles, said dispersion being produced by the process of claim 4.

References Cited

UNITED STATES PATENTS

| | | | |
|---|---|---|---|
| 3,095,388 | 6/1963 | Osmond | 260—41 |
| 3,166,524 | 1/1965 | Schmidle | 260—41 |
| 3,024,209 | 3/1962 | Ferrigno | 260—41 |

JULIUS FROME, *Primary Examiner.*

MORRIS LIEBMAN, L. H. GASTON, *Examiners.*

K. B. CLARKE, *Assistant Examiner.*